United States Patent
Maeda et al.

(10) Patent No.: US 10,753,788 B2
(45) Date of Patent: Aug. 25, 2020

(54) WHEEL LOAD ESTIMATION DEVICE

(71) Applicant: SUMITOMO RUBBER INDUSTRIES, LTD., Hyogo (JP)

(72) Inventors: Yusuke Maeda, Hyogo (JP); Keisuke Syutou, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 86 days.

(21) Appl. No.: 16/201,105

(22) Filed: Nov. 27, 2018

(65) Prior Publication Data

US 2019/0195679 A1 Jun. 27, 2019

(30) Foreign Application Priority Data

Dec. 22, 2017 (JP) ................. 2017-245770

(51) Int. Cl.
| | |
|---|---|
| *B60C 23/02* | (2006.01) |
| *G01G 19/02* | (2006.01) |
| *B60T 8/172* | (2006.01) |
| *B60C 23/06* | (2006.01) |
| *B60W 40/13* | (2012.01) |
| *G01G 19/12* | (2006.01) |

(52) U.S. Cl.
CPC ......... *G01G 19/027* (2013.01); *B60C 23/061* (2013.01); *B60T 8/172* (2013.01); *B60W 40/13* (2013.01); *G01G 19/024* (2013.01); *G01G 19/12* (2013.01); *B60T 2240/06* (2013.01); *B60T 2250/02* (2013.01)

(58) Field of Classification Search
None
See application file for complete search history.

(56) References Cited

U.S. PATENT DOCUMENTS

| | | | |
|---|---|---|---|
| 6,064,931 A | 5/2000 | Sawada et al. | |
| 2002/0008423 A1* | 1/2002 | Yasui | B60T 8/246 303/9.62 |

(Continued)

FOREIGN PATENT DOCUMENTS

| | | |
|---|---|---|
| EP | 0968892 A1 | 1/2000 |
| EP | 1637362 A1 | 3/2006 |

(Continued)

OTHER PUBLICATIONS

European Search Report, European Patent Office, Application No. P18197900.6, dated Apr. 23, 2019.

*Primary Examiner* — Andrew J Allen
(74) *Attorney, Agent, or Firm* — Greenblum & Bernstein, P.L.C.

(57) ABSTRACT

Provided is a wheel load estimation device configured to acquire wheel speed information of each wheel included in a vehicle from a wheel speed sensor provided in the vehicle; to calculate a front-rear load ratio and a left-right load ratio based on the wheel speed information; and to calculate a wheel load ratio expressing a relative wheel load between the wheels included in the vehicle, with respect to at least one wheel of the vehicle, based on the front-rear load ratio and the left-right load ratio. The front-rear load ratio is a ratio between a load applied to a front wheel of the vehicle and a load applied to a rear wheel of the vehicle, and the left-right load ratio is a ratio between a load applied to a left wheel of the vehicle and a load applied to a right wheel of the vehicle.

10 Claims, 10 Drawing Sheets

(56) References Cited

U.S. PATENT DOCUMENTS

| | | | |
|---|---|---|---|
| 2006/0064238 A1* | 3/2006 | Kitano | B60C 23/061 |
| | | | 701/124 |
| 2007/0204685 A1* | 9/2007 | Corniot | B60C 23/04 |
| | | | 73/146.2 |
| 2008/0208427 A1* | 8/2008 | Matsuno | B60W 30/18109 |
| | | | 701/80 |
| 2012/0245787 A1 | 9/2012 | Kawasaki | |
| 2013/0098149 A1 | 4/2013 | Yanase | |
| 2013/0144500 A1 | 6/2013 | Watanabe | |
| 2014/0008132 A1* | 1/2014 | Kamamann | B60T 8/1725 |
| | | | 177/1 |
| 2014/0257629 A1* | 9/2014 | Singh | B60C 23/0488 |
| | | | 701/34.4 |
| 2019/0210609 A1* | 7/2019 | Dharamshi | B60W 40/12 |
| 2020/0062268 A1* | 2/2020 | Steiner | B60C 23/0449 |

FOREIGN PATENT DOCUMENTS

| | | | | |
|---|---|---|---|---|
| EP | 2502759 | A1 | 9/2012 | |
| EP | 2583843 | A2 | 4/2013 | |
| JP | 2004-317443 | A | 11/2004 | |
| WO | WO-2013139977 | A1 * | 9/2013 | B60C 23/0477 |

* cited by examiner

WHEEL LOAD ESTIMATION DEVICE

CROSS REFERENCE TO RELATED APPLICATIONS

This application claims a priority to Japanese Patent Application No. 2017-245770 filed on Dec. 22 2017, which is hereby incorporated by reference in its entirety.

FIELD OF INVENTION

The present invention relates to a wheel load estimation device, method and program for estimating a wheel load of a wheel included in a vehicle.

BACKGROUND

A vehicle is provided with various control systems in order to make the vehicle move properly. Because the wheel loads of the wheels are sometimes used as control parameters in such a control system, these wheel loads need to be estimated accurately. For example, in an automatic brake control system, an appropriate braking force is distributed in accordance with the wheel load of each wheel.

JP 2004-317443A focuses on the establishment of a certain relationship between the air pressure of a tire, deflection of the tire (elastic deformation amount), and a wheel load, and discloses a method for estimating the wheel load based on the air pressure and the deflection of the tire.

SUMMARY OF THE INVENTION

Incidentally, in JP 2004-317443A, each tire needs to be provided with an air pressure sensor in order to directly measure the air pressure of the tire. In general, the vehicle is equipped with various measurement devices for realizing various controls to assist the movement of the vehicle, but the vehicle is not always equipped with an air pressure sensor. Also, the wheel load to be obtained is an approximate value unless the wheel load is measured directly, and thus a technique for improving estimation accuracy is always required.

An object of the present invention is to provide a wheel load estimation device capable of estimating a wheel load with high accuracy using simple equipment, and a wheel load estimation method and a wheel load estimation program for estimating a wheel load with high accuracy using simple equipment.

A wheel load estimation device according to a first aspect of the present invention is a wheel load estimation device configured to estimate a wheel load of a vehicle, the wheel load estimation device including a wheel speed acquisition unit, a load ratio calculation unit, and a wheel load calculation unit. The wheel speed acquisition unit acquires wheel speed information of each wheel included in the vehicle from a wheel speed sensor provided in the vehicle. The load ratio calculation unit calculates a front-rear load ratio and a left-right load ratio based on the wheel speed information, the front-rear load ratio being a ratio between a load applied to a front wheel of the vehicle and a load applied to a rear wheel of the vehicle, and the left-right load ratio being a ratio between a load applied to a left wheel of the vehicle and a load applied to a right wheel of the vehicle. The wheel load calculation unit calculates a wheel load ratio expressing a relative wheel load between the wheels included in the vehicle, with respect to at least one of the wheels of the vehicle, based on the front-rear load ratio and the left-right load ratio.

A wheel load estimation device according to a second aspect of the present invention is the wheel load estimation device according to the first aspect, in which the wheel load calculation unit calculates the wheel load based on a total weight of the vehicle and the wheel load ratio.

A wheel load estimation device according to a third aspect of the present invention is the wheel load estimation device according to the first aspect or the second aspect, in which the wheel load calculation unit calculates the wheel load ratio with respect to each wheel included in the vehicle.

A wheel load estimation device according to a fourth aspect of the present invention is the wheel load estimation device according to any of the first aspect to the third aspect, in which the load ratio calculation unit, based on the wheel speed information, calculates a front-rear frequency characteristic ratio that is a ratio between the magnitude of a gain of a frequency spectrum of an acceleration of the front wheel and the magnitude of a gain of a frequency spectrum of an acceleration of the rear wheel, calculates the front-rear load ratio based on the front-rear frequency characteristic ratio, calculates a left-right frequency characteristic ratio that is a ratio between the magnitude of a gain of a frequency spectrum of an acceleration of the left wheel and the magnitude of a gain of a frequency spectrum of an acceleration of the right wheel, and calculates the left-right load ratio based on the left-right frequency characteristic ratio.

A wheel load estimation method according to a fifth aspect of the present invention is a wheel load estimation method for estimating a wheel load of a vehicle, the wheel load estimation method including the following steps.

(1) A step of acquiring wheel speed information of each wheel included in the vehicle from a wheel speed sensor provided in the vehicle.

(2) A step of calculating a front-rear load ratio and a left-right load ratio based on the wheel speed information, the front-rear load ratio being a ratio between a load applied to a front wheel of the vehicle and a load applied to a rear wheel of the vehicle, and the left-right load ratio being a ratio between a load applied to a left wheel of the vehicle and a load applied to a right wheel of the vehicle.

(3) A step of calculating a wheel load ratio expressing a relative wheel load between the wheels included in the vehicle, with respect to at least one of the wheels of the vehicle, based on the front-rear load ratio and the left-right load ratio.

A wheel load estimation program according to a sixth aspect of the present invention is a wheel load estimation program for estimating a wheel load of a vehicle, the wheel load estimation program being configured to cause a computer to execute the following steps.

(1) A step of acquiring wheel speed information of each wheel included in the vehicle from a wheel speed sensor provided in the vehicle.

(2) A step of calculating a front-rear load ratio and a left-right load ratio based on the wheel speed information, the front-rear load ratio being a ratio between a load applied to a front wheel of the vehicle and a load applied to a rear wheel of the vehicle, and the left-right load ratio being a ratio between a load applied to a left wheel of the vehicle and a load applied to a right wheel of the vehicle.

(3) A step of calculating a wheel load ratio expressing a relative wheel load between the wheels included in the vehicle, with respect to at least one of the wheels of the vehicle, based on the front-rear load ratio and the left-right load ratio.

According to the first aspect of the present invention, it is possible to estimate a wheel load with high accuracy using simple equipment.

DETAILED DESCRIPTION OF THE PREFERRED EMBODIMENTS

Hereinafter, a wheel load estimation device, a wheel load estimation method, and a wheel load estimation program according to some embodiments of the present invention will be described with reference to the drawings.

1. First Embodiment 1-1. Configuration of Wheel Load Estimation Device

Figure 1:
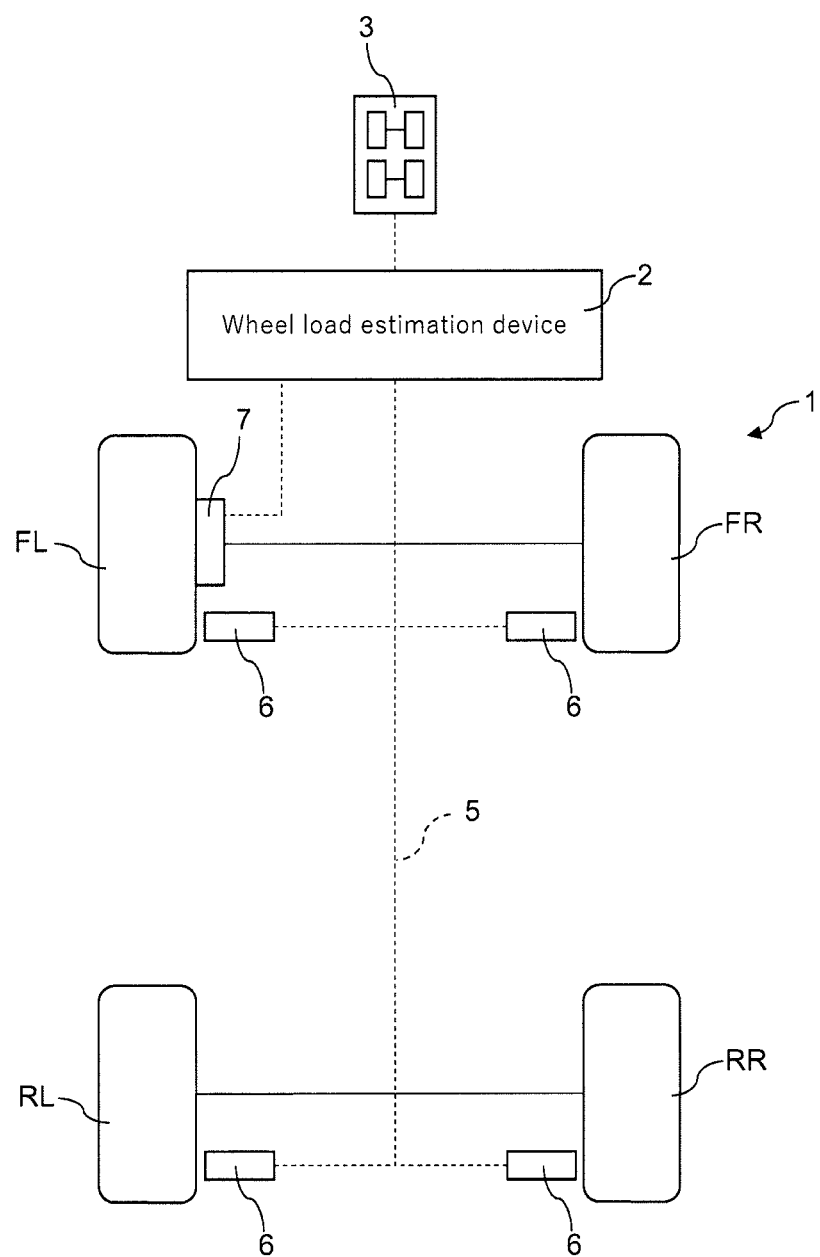
FIG. 1 is a schematic diagram showing a situation in which a wheel load estimation device according to a first embodiment of the present invention is installed in a vehicle.

FIG. 1 is a schematic diagram showing a situation in which a wheel load estimation device 2 according to the present embodiment is installed in a vehicle 1. The vehicle 1 is a four-wheel vehicle, and includes a front-left wheel FL, a front-right wheel FR, a rear-left wheel RL, and a rear-right wheel RR. The wheel load estimation device 2 has a function of estimating wheel loads applied to these wheels FL, FR, RL, and RR. Data on the estimated wheel loads is utilized for various controls for assisting the movement of the vehicle 1. For example, the data on the estimated wheel loads is transmitted to a brake control system, and is utilized to control a brake. Also, the data on the estimated wheel loads is transmitted to a tire pressure monitoring system (TPMS) for monitoring the air pressures of the tires mounted on the wheels FL, FR, RL, and RR, or the like, and is utilized to determine a decrease in pressure of the tires. In the TPMS, if a decrease in the pressure of a tire is detected based on the data on the estimated wheel loads, it is possible to issue a warning about the detection via a warning display 3 provided in the vehicle 1. An example of the TPMS is a method for determining a decrease in the pressure of a tire based on a change in a dynamic load radius of the tire, and the dynamic load radius of the tire is influenced by not only the a decrease in the pressure of the tire but also the wheel load. Thus, if this method is adopted, the influence of the wheel load is cancelled out of the dynamic load radius of the tire based on the data on the estimated wheel loads, and thereby a decrease in the pressure of the tire can be determined with high accuracy. Overloading or unbalanced loading for the vehicle 1 can also be detected based on the data on the estimated wheel loads, and if this is detected, it is possible to issue a warning about the detection via the warning display 3 provided in the vehicle 1. "Overloading" means a state in which loads that exceed an allowable load capacity are placed on the vehicle, and "unbalanced loading" means a state in which loads are unbalanced in the vehicle 1.

In the present embodiment, the wheel loads applied to the wheels FL, FR, RL, and RR are estimated based on the wheel speeds (rotational speed) of the wheels FL, FR, RL, and RR. The wheels FL, FR, RL, and RR are each equipped with a wheel speed sensor 6, and the wheel speed sensor 6 detects, at a predetermined sampling period $\Delta T$, information expressing the wheel speed of the wheel (also referred to as "wheel speed information" hereinafter) to which the wheel speed sensor 6 is attached. The wheel speed sensor 6 is connected to the wheel load estimation device 2 via a communication line 5, and the wheel speed information detected by each wheel speed sensor 6 is transmitted to the wheel load estimation device 2 in real-time.

Any sensor can be used as the wheel speed sensor 6 as long as it can detect the wheel speeds of the wheels FL, FR, RL, and RR while the vehicle is moving. For example, it is possible to use a type of sensor that measures the wheel speed from a signal output from a magnetic pickup, and a type of sensor that generates power utilizing rotation like a dynamo and measures the wheel speed based on the resulting voltage. There is no particular limitation on the position at which the wheel speed sensor 6 is attached, and any position can be selected as appropriate depending on the type of sensors as long as the wheel speed can be detected.

In the present embodiment, the front-left wheel, which is one of the drive wheels, is equipped with a wheel torque sensor (referred to as "WT sensor" hereinafter) 7. The WT sensor 7 detects a wheel torque of the vehicle 1. The WT sensor 7 is connected to the wheel load estimation device 2 via the communication line 5, and the information on the wheel torque detected by the WT sensor 7 is transmitted to the wheel load estimation device 2 in real-time.

There is also no particular limitation on the structure of the WT sensor 7 or the position at which the WT sensor 7 is attached, as long as the sensor can detect the wheel torque of the drive wheels of the vehicle 1. Various types of sensors are commercially available as the WT sensor, and their configurations are already known, and thus detailed description thereof will be omitted herein. Also, it is possible to detect the wheel torque without using the WT sensor 7, and for example, it is also possible to estimate the wheel torque based on an engine torque obtained from a control device of an engine.

Figure 2:
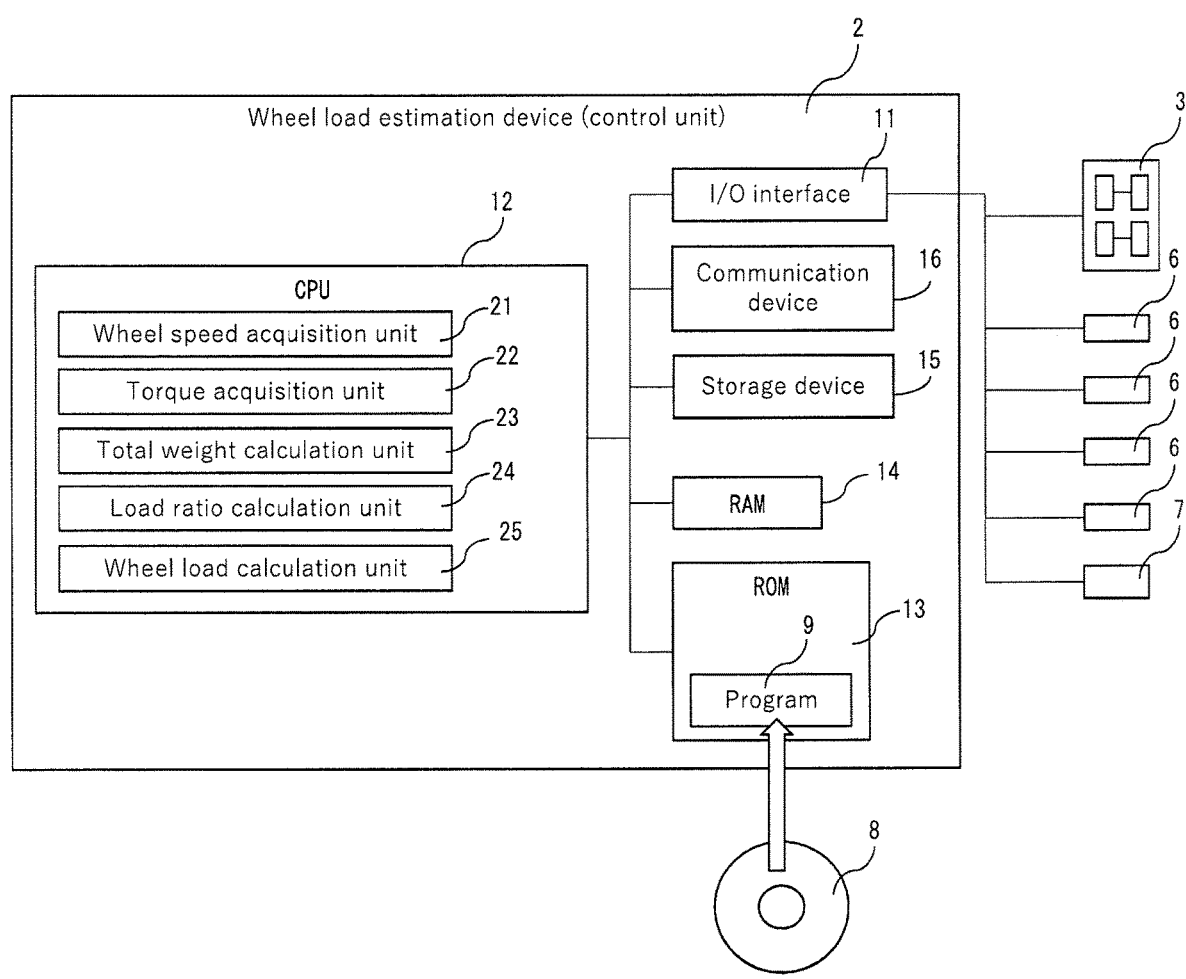
FIG. 2 is a block diagram showing an electrical configuration of the wheel load estimation device according to the first embodiment.

FIG. 2 is a block diagram showing an electrical configuration of the wheel load estimation device 2. As shown in FIG. 2, the wheel load estimation device 2 is a control unit installed in the vehicle 1, and includes an I/O interface 11, a CPU 12, a ROM 13, a RAM 14, and a nonvolatile rewritable storage device 15. The I/O interface 11 is a communication device for communicating with external devices such as the wheel speed sensor 6, the warning display 3, and the WT sensor 7. A program 9 for controlling the operations of the units of the vehicle 1 is stored in the ROM 13. The program 9 is written to the ROM 13 from a storage medium 8 such as a CD-ROM. The CPU 12 reads out the program 9 from the ROM 13 and executes the program 9, and thereby virtually operates as the wheel speed acquisition unit 21, the torque acquisition unit 22, the total weight calculation unit 23, the load ratio calculation unit 24, and the wheel load calculation unit 25. The detailed operations of the units 21 to 25 will be described later. The storage device 15 is constituted by a hard disk, a flash memory, or the like. Note that the storage location of the program 9 may be the storage device 15 instead of the ROM 13. The RAM 14 and the storage device 15 are used as appropriate for the calculation performed by the CPU 12.

The warning display 3 can be realized in any form such as a liquid crystal display element or a liquid crystal monitor, as long as notification of a decrease in the pressure of a tire, overloading, unbalanced loading, or the like can be given to a user. Although the position to which the warning display 3 is attached can be selected as appropriate, it is preferable to provide the warning display 3 at a position that a driver can easily recognize, such as on the instrument panel, for example. If the control unit (wheel load estimation device 2) is connected to a car navigation system, a monitor for car navigation can be used as the warning display 3. If a monitor is used as the warning display 3, a warning can be displayed on the monitor as an icon or character information.

1-2. Wheel Load Estimation Processing

Figure 3:
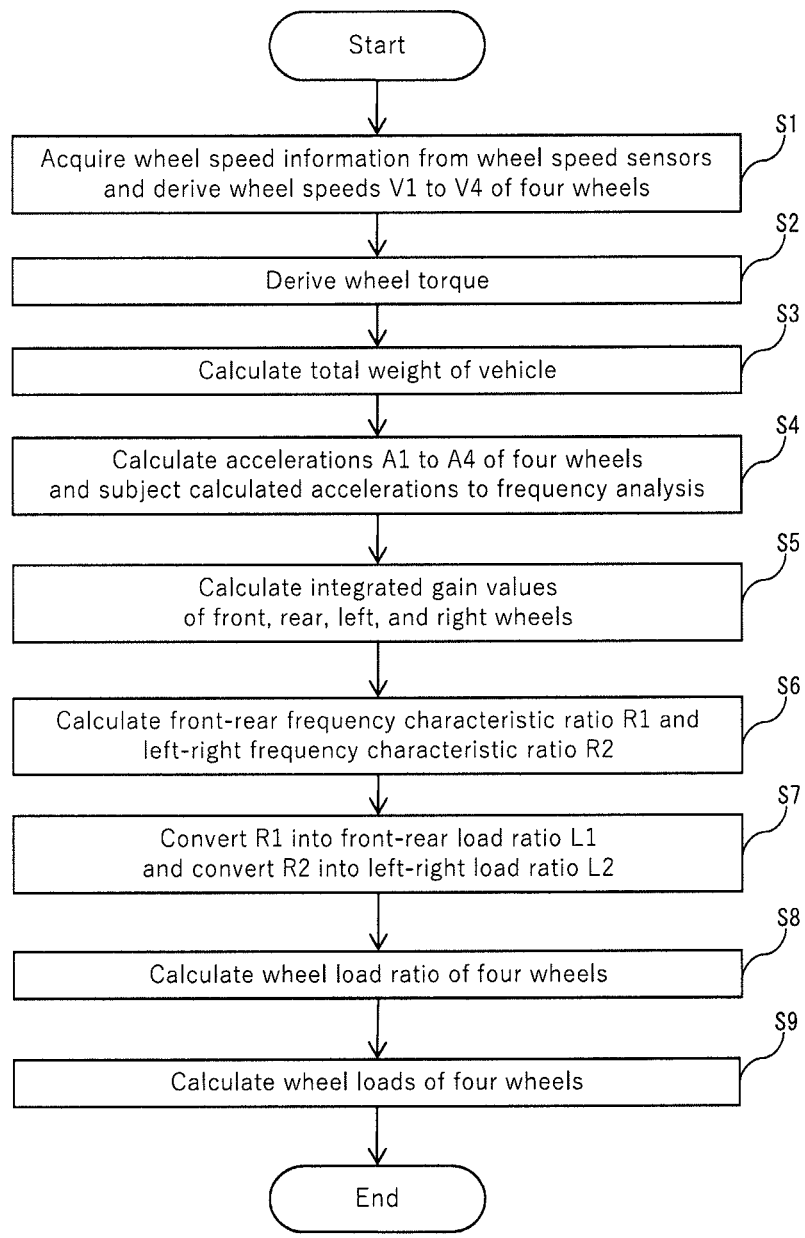
FIG. 3 is a flowchart showing the flow of wheel load estimation processing according to the first embodiment.

Wheel load estimation processing for estimating the wheel loads of the wheels FL, FR, RL, and RR will be described below with reference to FIG. 3. The wheel load estimation processing shown in FIG. 3 starts when movement of the vehicle 1 starts, and the wheel load estimation processing ends when the movement of the vehicle 1 stops, for example.

The algorithm for estimating a wheel load through this processing is based on the frequency characteristics of a rotating wheel. More specifically, the frequency characteristics of the rotating wheel change according to a load applied to the wheel, that is, according to a change in the wheel load. That is, if the wheel load of a wheel increases, the area of contact with a road surface increases, and a force that the tire mounted on the wheel receives from the road surface increases. Also, the elastic energy of springs in side wall portions of the tires increases. On the other hand, if the wheel load of the wheel decreases, the area of contact with the road surface decreases, and a force that the tire receives from the road surface decreases. Also, the elastic energy of the springs in the side wall portions of the tires decreases. The frequency characteristics of the wheels change depending on such a phenomenon caused by a change in the wheel load.

Figure 4A:
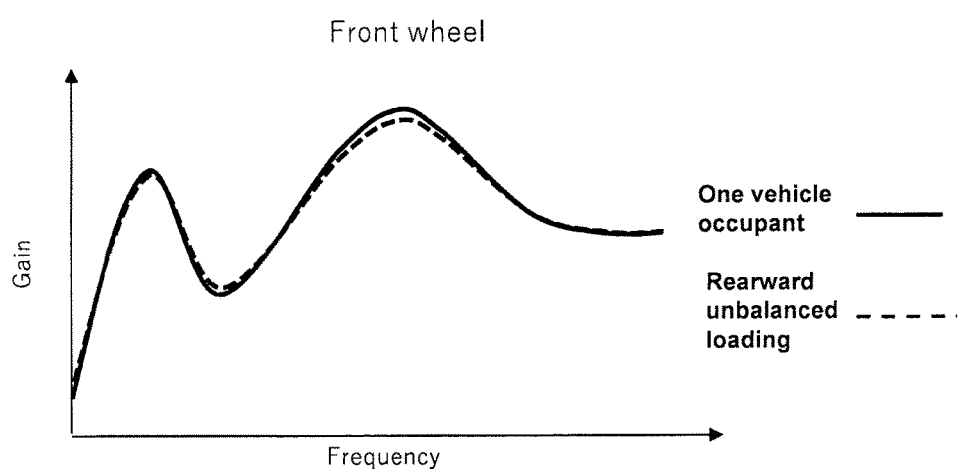
FIG. 4A is a graph of frequency spectra of accelerations of front wheels under two load conditions.
Figure 4B:
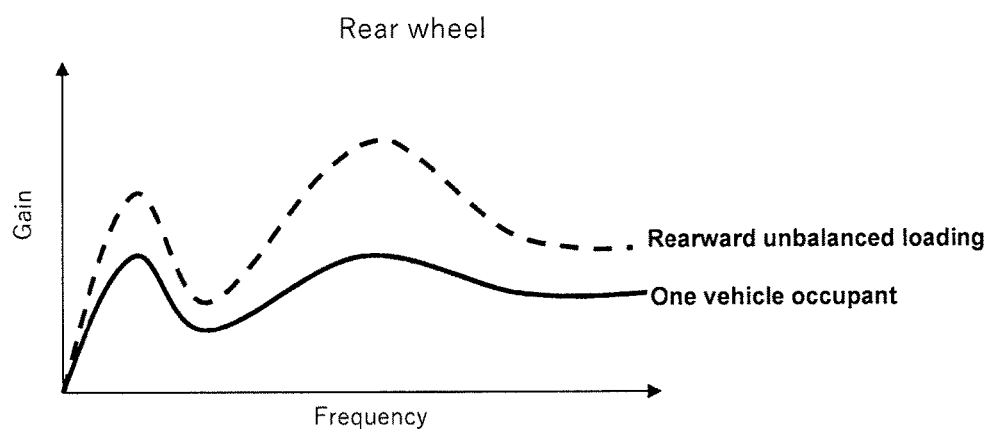
FIG. 4B is a graph of frequency spectra of accelerations of rear wheels under two load conditions.
Figure 5:
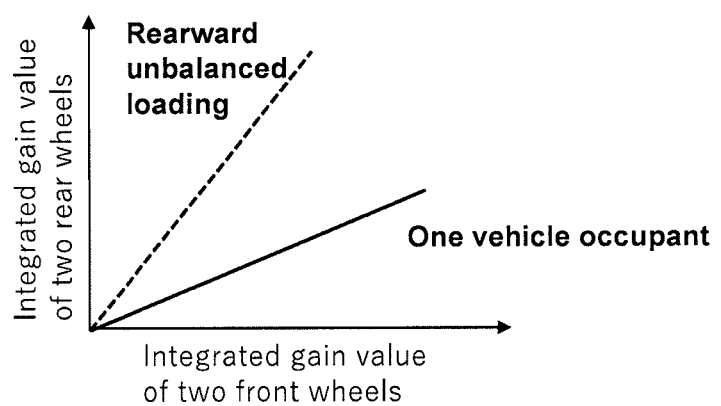
FIG. 5 is a graph showing a relationship between an integrated gain value of the two front wheels and an integrated gain value of the two rear wheels under the two load conditions.

FIG. 4A is a graph of a frequency spectrum of the acceleration (rotational acceleration) of the front wheel, and shows a gain when one driver is in the vehicle 1 (one vehicle occupant) and a gain when one driver is in the vehicle 1 and loads are placed toward the rear of the vehicle 1 in an unbalanced manner (rearward unbalanced loading). FIG. 4B is a graph of a frequency spectrum of the acceleration (rotational acceleration) of the rear wheel, and shows a gain in the case of one vehicle occupant and rearward unbalanced loading. As shown in these diagrams, the magnitude of the gain changes according to a change in the wheel load. Also, these diagrams show that the frequency spectrum corresponding to a wheel with a large wheel load is large, and the frequency spectrum corresponding to a wheel with a small wheel load is small. However, this example relates to a front-engine car, and thus the rearward unbalanced loading condition does not influence the gain of the front wheel a lot. Also, FIG. 5 is a graph expressing a relationship between the integrated gain value of the two front wheels and the integrated gain value of the two rear wheels. As shown in FIG. 5, under the same loading condition, the integrated gain value of the two front wheels and the integrated gain value of the two rear wheels are in an approximate linear relationship, and the ratio thereof (referred to as "front-rear frequency characteristic" hereinafter) is approximately constant. Meanwhile, the loading condition, that is, the wheel load depends on a front-rear frequency characteristic ratio. Note that the integrated gain values of the two front wheels and the two rear wheels may be the sum of integrated values obtained by respectively integrating the gain of the acceleration of the two front wheels and the gain of the acceleration of the two rear wheels in a predetermined frequency band, integrated values obtained by respectively integrating the gain of the acceleration of the average wheel speed of the two front wheels and the gain of the acceleration of the average wheel speed of the two rear wheels in a predetermined frequency band, or integrated values obtained by respectively integrating the gain of the acceleration of the difference between the wheel speeds of the two front wheels and the gain of the acceleration of the difference between the wheel speeds of the two rear wheels in a predetermined frequency band.

Figure 6A:
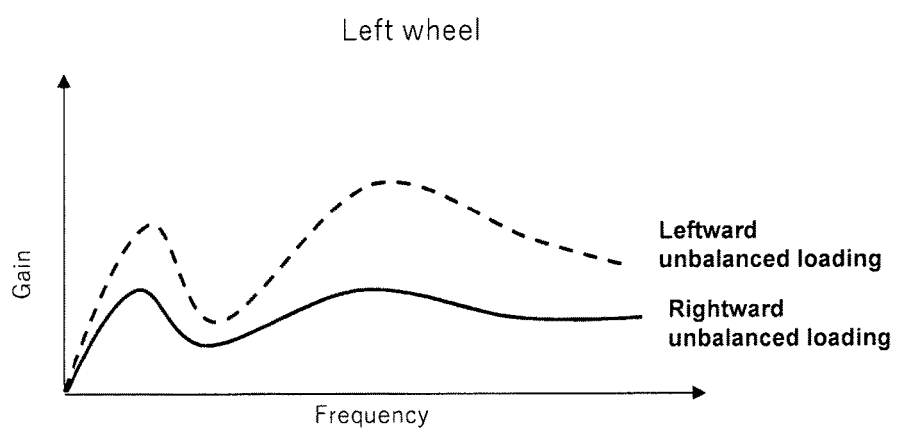
FIG. 6A is a graph of frequency spectra of accelerations of left wheels under the two load conditions.
Figure 6B:
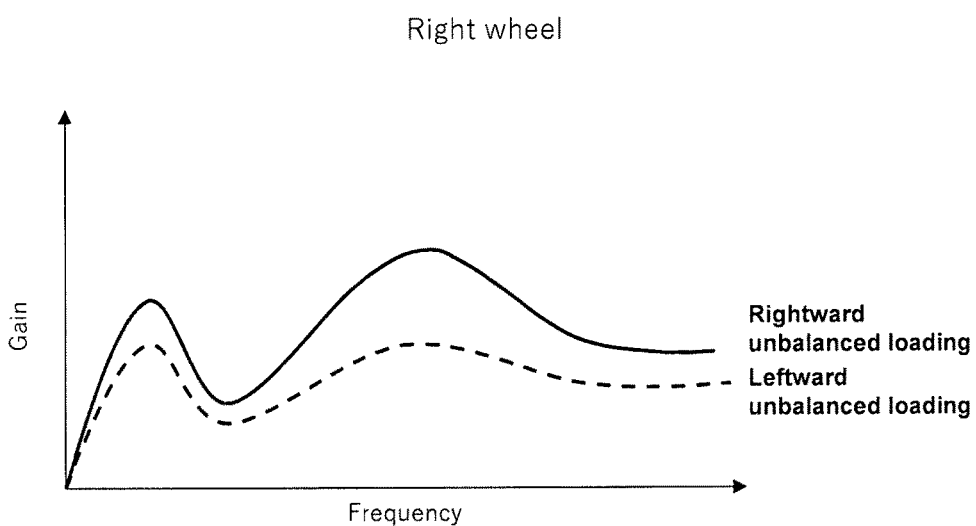
FIG. 6B is a graph of frequency spectra of accelerations of right wheels under the two load conditions.
Figure 7:
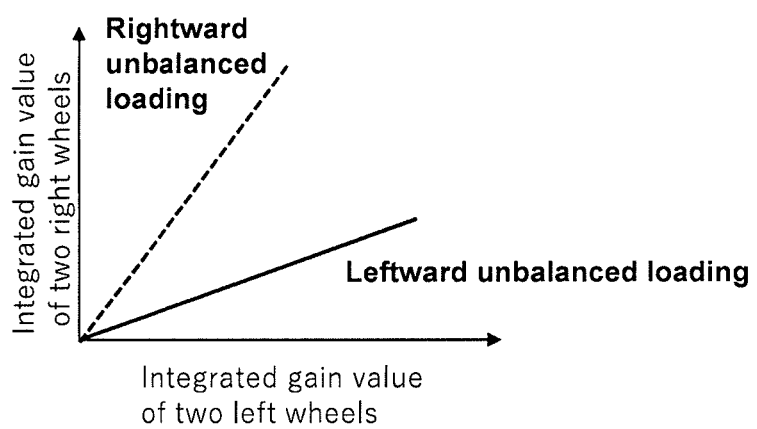
FIG. 7 is a graph showing a relationship between an integrated gain value of the two left wheels and an integrated gain value of the two right wheels under the two load conditions.

FIG. 6A is a graph of the frequency spectra of the acceleration (rotational acceleration) of the left wheels and FIG. 6B is a graph of the frequency spectra of the acceleration of the right wheels, FIG. 6A showing the gain in a case where one driver is in the vehicle and a load is placed rightward of the vehicle 1 in an unbalanced manner (referred to as "rightward unbalanced loading" hereinafter), and FIG. 6B showing the gain in a case where one driver is in the vehicle and a load is placed leftward in an unbalanced manner (referred to as "leftward unbalanced loading" hereinafter). These diagrams also show that the magnitude of the gain changes according to a change in the wheel load. These diagrams also show that the frequency spectrum corresponding to a wheel with a large wheel load is large, and the frequency spectrum corresponding to a wheel with a small wheel load is small. Also, FIG. 7 is a graph expressing a relationship between the integrated gain value of the two left wheels and the integrated gain value of the two right wheels under the leftward unbalanced loading and rightward unbalanced loading conditions. As shown in FIG. 7, the integrated gain value of the two left wheels and the integrated gain value of the two right wheels are in an approximately linear relationship under the same loading condition, and the ratio thereof (referred to as "left-right frequency characteristic ratio" hereinafter) is approximately constant. Meanwhile, the loading condition, that is, the wheel load depends on the left-right frequency characteristic ratio. Note that the integrated gain values of the two left wheels and the two right wheels may be the sum of integrated values obtained by respectively integrating the gain of the acceleration of the two left wheels and the gain of the acceleration of the two right wheels in a predetermined frequency band, integrated values obtained by respectively integrating the gain of the acceleration of the average wheel speed of the two left wheels and the gain of the acceleration of the average wheel speed of the two right wheels in a predetermined frequency band, or integrated values obtained by respectively integrating the gain of the acceleration of the difference between the wheel speeds of the two left wheels and the gain of the acceleration of the difference between the wheel speeds of the two right wheels in a predetermined frequency band.

Figure 8:
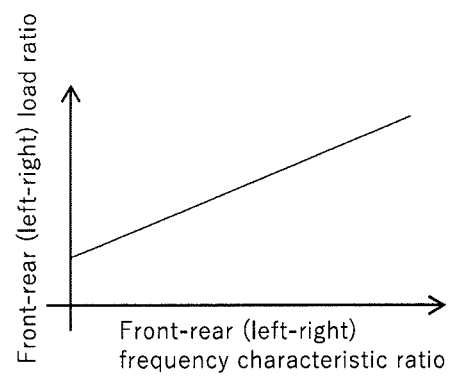
FIG. 8 is a graph showing a relationship between the front-rear (left-right) frequency characteristic ratio and a front-rear (left-right) load ratio.

Furthermore, as shown in FIG. 8, it was found that the front-rear frequency characteristic ratio and the front-rear load ratio are in an approximate linear relationship. Also, the same was confirmed for the left-right frequency characteristic ratio and the left-right load ratio. Note that the "front-rear load ratio" refers to a ratio between a load applied to the front wheels and a load applied to the rear wheels, and the "left-right load ratio" refers to a ratio between a load applied to the left wheels and a load applied to the right wheels. More specifically, in the present embodiment, the front-rear load ratio is the ratio between the sum of the wheel loads of the two front wheels and the sum of the wheel loads of the two rear wheels, and the left-right load ratio is the ratio between the sum of the wheel loads of the two left wheels and the sum of the wheel loads of the two right wheels. In another embodiment, for example, the left-right load ratio may be calculated separately for the front wheels and the rear wheels. Hereinafter, the detailed wheel load estimation processing based on these findings will be described.

First, in step S1, wheel speeds V1 to V4 are derived. V1 to V4 respectively represent the rotational speeds of the wheels FL, FR, RL, and RR. Herein, the wheel speed acquisition unit 21 acquires wheel speed information from the wheel speed sensor 6, and the load ratio calculation unit 24 converts this information into the wheel speeds V1 to V4.

In the subsequent step S2, a wheel torque of the vehicle 1 is derived. Herein, the torque acquisition unit 22 acquires a signal output from the WT sensor 7, and the load ratio calculation unit 24 converts this signal into the wheel torque.

In the subsequent step S3, the total weight calculation unit 23 calculates a total weight (weight) M of the vehicle 1. In the present embodiment, the total weight M is calculated based on the equation of motion below. In the equation below, F represents the wheel torque derived in step S2. $\alpha$ represents the acceleration of the vehicle 1, and is calculated from the wheel speeds V1 to V4. g represents the gravitational acceleration, and $\theta$ represents a road inclination. $\theta$ can be calculated from data of a GPS (position measurement sensor) installed in the vehicle 1, for example.

$$F=M\alpha+Mg\cdot\sin\theta$$

Note that because various methods are known as a method for estimating the total weight M of the vehicle 1, detailed description thereof will be omitted herein, but for better understanding, Japanese Patent 5346659, Japanese Patent 4926258, and the like filed by this applicant can be referenced.

In the subsequent step S4, the load ratio calculation unit 24 evaluates the frequency characteristics of waveform signals of the wheel speeds V1 to V4. Specifically, the load ratio calculation unit 24 differentiates time-series data of the wheel speeds V1 to V4 over time so as to calculate accelerations A1 to A4. A1 to A4 respectively represent the rotational accelerations of the wheels FL, FR, RL, and RR. Thereafter, the load ratio calculation unit 24 performs a fast Fourier transform on the accelerations A1 to A4, and derives the corresponding frequency spectra. The frequency characteristics can also be evaluated through time-series estimation with an autoregressive model, or distribution of the time-series data, in addition to the fast Fourier transform processing, for example.

In the subsequent step S5, the load ratio calculation unit 24 calculates the integrated gain values of the two front wheels (FL+FR), the two rear wheels (RL+RR), the two left wheels (FL+RL), and the two right wheels (FR+RR) based on the frequency spectra of the wheels FL, FR, RL, and RR derived in step S4. As described above, the integrated gain value expresses the magnitude of the gain. Note that when the integrated gain value is calculated, the frequency spectrum is integrated in a band from zero to the Nyquist frequency in the present embodiment, but integration may be performed limited to a band in which the influence of a load is significantly exhibited. Also, integration intervals for the front, rear, left, and right wheels are not necessarily the same. Hereinafter, the integrated gain values of the two front wheels, the two rear wheels, the two left wheels, and the two right wheels respectively refer to "front wheel gain", "rear wheel gain", "left wheel gain", and "right wheel gain".

In the subsequent step S6, the load ratio calculation unit 24 calculates a front-rear frequency characteristic ratio R1 and a left-right frequency characteristic ratio R2, according to the equations below.

R1=rear wheel gain/front wheel gain

R2=right wheel gain/left wheel gain

In the subsequent step S7, the load ratio calculation unit 24 calculates a front-rear load ratio L1 and a left-right load ratio L2. L1 and L2 are respectively converted from R1 and R2. L1 and R1, and L2 and R2 are in approximately linear relationships as described above with reference to FIG. 8, and thus L1 and L2 are calculated using constants c1, c2, d1, and d2 as follows.

$$L1=c1\times R1+d1$$

$$L2=c2\times R2+d2$$

Here, the constants c1, c2, d1, and d2 are stored in the storage device 15 in advance. A test run is performed in a state in which goods with known weights are placed in the vehicle 1, multiple (R1 and L1) data sets are acquired from sampling data at this time, the relationship between R1 and L1 is subjected to linear regression based on the acquired data sets, and thereby the constants c1 and d1 are obtained. Also, multiple (R2 and L2) data sets are acquired in a similar manner, similar processing is performed on the acquired data sets, and thereby the constants c2 and d2 are obtained.

In the subsequent step S8, the wheel load calculation unit 25 calculates a front axle load ratio x and a rear axle load ratio y, and calculates wheel load ratios $L_{FL}$, $L_{FR}$, $L_{RS}$, and $L_{RR}$ based on x and y. The front axle load ratio x is a percentage of the sum of the wheel loads of the two front wheels with respect to the total weight M of the vehicle 1. The rear axle load ratio y is a percentage of the sum of the wheel loads of the two rear wheels with respect to the total weight M of the vehicle 1. x and y are calculated using the equations below.

$$x=1/(1+L1)$$

$$y=1-x=L1/(1+L1)$$

Also, the wheel load ratios $L_{FL}$, $L_{FR}$, $L_{RL}$, and $L_{RR}$ calculated here are indices that respectively express relative wheel loads between the wheels FL, FR, RL, and RR. The wheel load ratios $L_{FL}$, $L_{FR}$, $L_{RL}$, and $L_{RR}$ in the present embodiment are respectively defined as the percentages of the wheel loads of the wheels FL, FR, RL, and RR with respect to the total weight M of the vehicle 1, and are calculated according to the equations below.

$$L_{FL}=x/(1+L2)$$

$$L_{FR}==x-L_{FL}$$

$$L_{RL}=y/(1+L2)$$

$$L_{RR}==y-L_{RL}$$

In the subsequent step S9, the wheel load calculation unit 25 calculates the wheel loads of the wheels FL, FR, RL, and RR using the wheel load ratios $L_{FL}$, $L_{FR}$, $L_{RL}$, and $L_{RR}$ and the total weight M of the vehicle 1, according to the equations below. Accordingly, the wheel load estimation processing ends.

FL wheel: $M \times L_{FL}$

FR wheel: $M \times L_{FR}$

RL wheel: $M \times L_{RL}$

RR wheel: $M \times L_{RR}$

2. Second Embodiment

Figure 9:
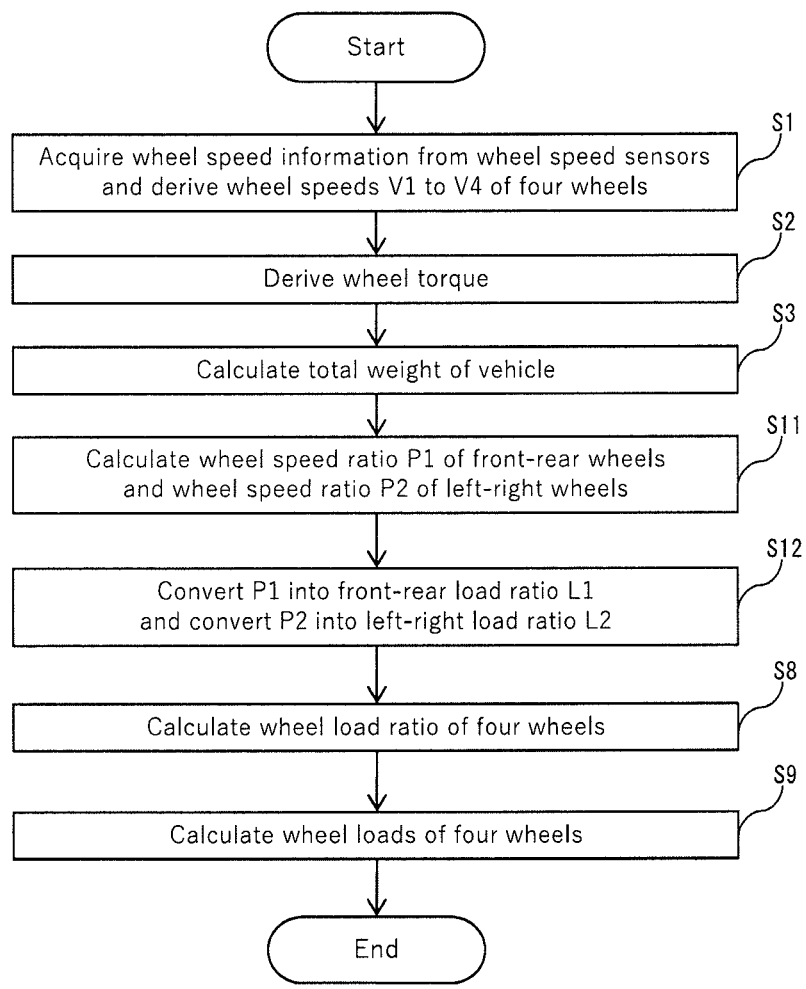
FIG. 9 is a flowchart showing the flow of wheel load estimation processing according to a second embodiment.

Hereinafter, wheel load estimation processing according to a second embodiment will be described with reference to FIG. 9. Note that the configuration of the wheel load estimation device according to the second embodiment is the same as that of the first embodiment. Also, as is clear from a comparison between FIGS. 3 and 9, many steps of the wheel load estimation processing are redundant, and thus differences therebetween will be mainly described.

Estimation of the wheel load using this processing is realized with a focus on the dynamic load radii of the tires mounted on the wheels FL, FR, RL, and RR. More specifically, when a load is applied to tires, the tires collapse and their dynamic load radii decrease, and thus the wheel speeds V1 to V4 increase. Thus, herein, the wheel load is estimated with a focus on changes in the wheel speeds V1 to V4.

In the second embodiment, similarly to the first embodiment, first, steps S1 to S3 are executed, and thereafter step S11 is executed. In step S11, the load ratio calculation unit 24 calculates wheel speed ratios P1 and P2 of the tires based on the wheel speeds V1 to V4. P1 represents a ratio between the wheel speeds of the two front wheels and the wheel speeds of the two rear wheels, and P2 represents a ratio between the wheel speeds of the two left wheels and the wheel speeds of the two right wheels. P1 and P2 are respectively calculated according to the equations below.

$$P1=(V3+V4)/(V1+V2)$$

$$P2=(V2+V4)/(V1+V3)$$

Next, in step S12, the load ratio calculation unit 24 calculates a front-rear load ratio L1 and a left-right load ratio L2. Herein, L1 and L2 are respectively converted from P1 and P2. L1 and P1, and L2 and P2 are also in approximate linear relationships, and thus L1 and L2 are calculated using constants a1, b1, a2, and b2 as follows.

$$L1=a1 \times P1+b1$$

$$L2=a2 \times P2+b2$$

Herein, the constants a1, b1, a2, and b2 are stored in the storage device 15 in advance. A test run is performed in a state in which goods with known weights are placed in the vehicle 1, multiple (P1 and L1) data sets are acquired from sampling data at this time, the relationship between P1 and L1 is subjected to linear regression based on the acquired data sets, and thereby the constants a1 and b1 are obtained. Also, multiple (P2 and L2) data sets are acquired in a similar manner, similar processing is performed on the acquired data sets, and thereby the constants a2 and b2 are obtained.

Thereafter, similarly to the first embodiment, steps S8 and S9 are executed, and the wheel load ratios $L_{FL}$, $L_{FR}$, $L_{RL}$, and $L_{RR}$ and the wheel loads of the wheels FL, FR, RL, and RR are calculated.

Incidentally, the dynamic load radius of a tire changes depending on not only a load applied to the tire but also the internal pressure of the tire. Thus, from the viewpoint of being less influenced by a decrease in the pressure of a tire, the wheel load estimation processing according to the first embodiment is superior, but from the viewpoint of the load of arithmetic processing, the wheel load estimation processing according to the second embodiment is superior.

3. Variations

Although embodiments of the present invention have been described above, the present invention is not limited to the above-described embodiments, and various modifications can be made without departing from the spirit of the invention. Modifications such as the following can be made, for example. Also, the gist of variations below can be combined as appropriate.

3-1

Although the wheel loads of the wheels are calculated using the wheel load ratios $L_{FL}$, $L_{FR}$, $L_{RL}$, and $L_{RR}$ and the total weight M of the vehicle 1 in the above-described embodiments, if only the wheel load ratios are required, steps S2, S3, and S9 can be omitted.

3-2

With the wheel load estimation device for a tire according to the above-described embodiments, there is no limitation on the driving method in the four-wheel vehicle, and the invention can be applied to any of an FF vehicle, an FR vehicle, an MR vehicle, and a 4 WD vehicle. Moreover, the invention is not limited to a four-wheel vehicle, and can be applied to a three-wheel vehicle, a six-wheel vehicle, or the like.

3-3

Although the wheel load ratios and the wheel loads of the wheels are calculated in the above-described embodiment, these may be calculated for parts of the wheels FL, FR, RL, and RR.

WORKING EXAMPLE 1

Experimental Conditions

A gasoline-hybrid FF (front engine/front drive) four-wheel car provided with summer tires with a size of 205/60R16 was driven on an asphalt road surface under various loading conditions (Conditions 1 to 9) shown in Table 1. Note that the total weight of the vehicle and the wheel load of each wheel in Table 1 are values measured by a wheel load measurement meter that was placed under the tire, and the unit of these values is kg.

TABLE 1

| Loading conditions | | Total weight of vehicle | FL wheel load | FR wheel load | RL wheel load | RR wheel load |
|---|---|---|---|---|---|---|
| Condition 1 | one vehicle occupant | 1620 | 436 | 470 | 342 | 372 |
| Condition 2 | medium load (balanced) | 1825 | 465 | 475 | 438 | 447 |
| Condition 3 | medium load (rightward unbalanced loading) | 1825 | 420 | 517 | 404 | 484 |
| Condition 4 | medium load (leftward unbalanced loading) | 1825 | 479 | 460 | 451 | 435 |
| Condition 5 | medium load (rearward unbalanced loading) | 1825 | 449 | 469 | 452 | 455 |
| Condition 6 | full loading (balanced) | 2030 | 495 | 481 | 531 | 523 |
| Condition 7 | full loading (rightward unbalanced loading) | 2030 | 405 | 547 | 474 | 604 |
| Condition 8 | full loading (leftward unbalanced loading) | 2030 | 505 | 448 | 570 | 507 |
| Condition 9 | full loading (rearward unbalanced loading) | 2030 | 466 | 459 | 560 | 545 |

Experimental Results

Figure 10:
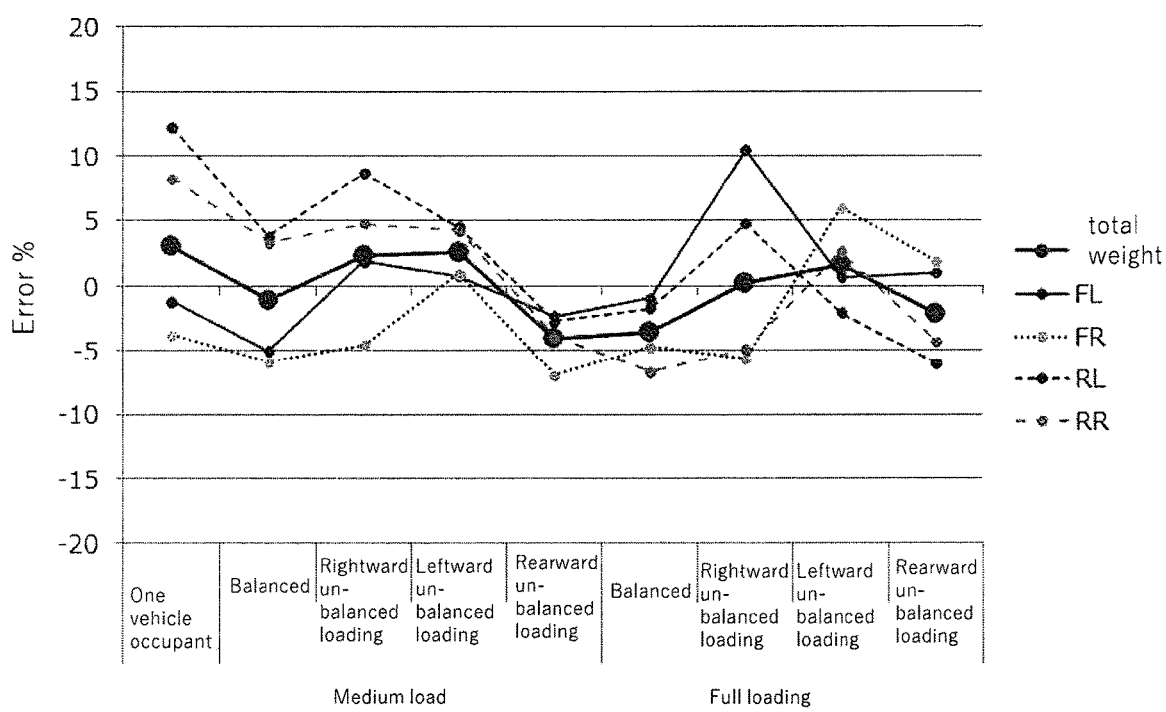
FIG. 10 is a graph showing the percentages of error in wheel load estimation according to working examples.

When the total weight of the vehicle and the wheel load of each wheel were estimated by the wheel load estimation processing according to the first embodiment based on the sampling data above while the vehicle is moving, the results of Table 2 were obtained. The unit of the weights in Table 2 is kg, and the percentages of error in the estimation values with respect to the values of Table 1 are shown in the lower row of each section. FIG. 10 is a graph of the percentages of these errors. From the result above, a high accuracy of the algorithm of the wheel load estimation processing according to the first embodiment was confirmed.

TABLE 2

| Loading conditions | | Total weight of vehicle | FL wheel load | FR wheel load | RL wheel load | RR wheel load |
|---|---|---|---|---|---|---|
| Condition 1 | one vehicle occupant | 1670 (+3.08%) | 431 (−1.15%) | 452 (−3.74%) | 384 (+12.20%) | 403 (+8.29%) |
| Condition 2 | medium load (balanced) | 1807 (−1.08%) | 442 (−4.98%) | 448 (−5.91%) | 456 (+3.81%) | 462 (+3.33%) |
| Condition 3 | medium load (rightward unbalanced loading) | 1867 (+2.36%) | 427 (+1.92%) | 494 (−4.52%) | 439 (+8.70%) | 507 (+4.78%) |
| Condition 4 | medium load (leftward unbalanced loading) | 1872 (+2.59%) | 483 (+0.79%) | 464 (+0.93%) | 472 (+4.56%) | 454 (+4.27%) |
| Condition 5 | medium load (rearward unbalanced loading) | 1752 (−3.98%) | 439 (−2.27%) | 436 (−6.96%) | 440 (−2.69%) | 437 (−3.89%) |
| Condition 6 | full loading (balanced) | 1959 (−3.51%) | 490 (−0.95%) | 458 (−4.69%) | 522 (−1.70%) | 488 (−6.69%) |
| Condition 7 | full loading (rightward unbalanced loading) | 2034 (+0.23%) | 446 (+10.44%) | 516 (−5.67%) | 497 (+4.81%) | 575 (−4.85%) |
| Condition 8 | full loading (leftward unbalanced loading) | 2059 (+1.60%) | 508 (+0.69%) | 474 (+6.05%) | 557 (−2.04%) | 520 (+2.68%) |
| Condition 9 | full loading (rearward unbalanced loading) | 1988 (−2.13%) | 472 (+0.99%) | 468 (+1.90%) | 526 (−6.01%) | 522 (−4.23%) |

LIST OF REFERENCE NUMERALS

1 Vehicle
2 Wheel load estimation device (computer)
21 Wheel speed acquisition unit
22 Torque acquisition unit
23 Total weight calculation unit
24 Load ratio calculation unit
25 Wheel load calculation unit
6 Wheel speed sensor
FL Front-left wheel
FR Front-right wheel
RL Rear-left wheel
RR Rear-right wheel
V1 Wheel speed of front-left wheel
V2 Wheel speed of front-right wheel
V3 Wheel speed of rear-left wheel
V4 Wheel speed of rear-right wheel
A1 Acceleration of front-left wheel
A2 Acceleration of front-right wheel
A3 Acceleration of rear-left wheel
A4 Acceleration of rear-right wheel
R1 Front-rear frequency characteristic ratio
R2 Left-right frequency characteristic ratio
L1 Front-rear load ratio
L2 Left-right load ratio
$L_{FL}$ Wheel load ratio of front-left wheel
$L_{FR}$ Wheel load ratio of front-right wheel
$L_{RS}$ Wheel load ratio of rear-left wheel
$L_{RR}$ Wheel load ratio of rear-right wheel
M Total weight of vehicle

What is claimed is:

1. A wheel load estimation device configured to estimate a wheel load of a vehicle, the wheel load estimation device comprising:
    a wheel speed acquisition unit configured to acquire wheel speed information of each wheel included in the vehicle from a wheel speed sensor provided in the vehicle;
    a load ratio calculation unit configured to calculate a front-rear load ratio and a left-right load ratio based on the wheel speed information, the front-rear load ratio being a ratio between a load applied to a front wheel of the vehicle and a load applied to a rear wheel of the vehicle, and the left-right load ratio being a ratio between a load applied to a left wheel of the vehicle and a load applied to a right wheel of the vehicle; and
    a wheel load calculation unit configured to calculate a wheel load ratio expressing a relative wheel load between the wheels included in the vehicle, with respect to at least one of the wheels of the vehicle, based on the front-rear load ratio and the left-right load ratio.

2. The wheel load estimation device according to claim 1, wherein the wheel load calculation unit is configured to calculate the wheel load based on a total weight of the vehicle and the wheel load ratio.

3. The wheel load estimation device according to claim 1, wherein the wheel load calculation unit is configured to calculate the wheel load ratio with respect to each wheel included in the vehicle.

4. The wheel load estimation device according to claim 2, wherein the wheel load calculation unit is configured to calculate the wheel load ratio with respect to each wheel included in the vehicle.

5. The wheel load estimation device according to claim 1, wherein the load ratio calculation unit is configured to, based on the wheel speed information,
    calculate a front-rear frequency characteristic ratio that is a ratio between the magnitude of a gain of a frequency spectrum of an acceleration of the front wheel and the magnitude of a gain of a frequency spectrum of an acceleration of the rear wheel,
    calculate the front-rear load ratio based on the front-rear frequency characteristic ratio,
    calculate a left-right frequency characteristic ratio that is a ratio between the magnitude of a gain of a frequency spectrum of an acceleration of the left wheel and the magnitude of a gain of a frequency spectrum of an acceleration of the right wheel, and
    calculate the left-right load ratio based on the left-right frequency characteristic ratio.

6. The wheel load estimation device according to claim 2, wherein the load ratio calculation unit is configured to, based on the wheel speed information,
    calculate a front-rear frequency characteristic ratio that is a ratio between the magnitude of a gain of a frequency spectrum of an acceleration of the front wheel and the magnitude of a gain of a frequency spectrum of an acceleration of the rear wheel,
    calculate the front-rear load ratio based on the front-rear frequency characteristic ratio,
    calculate a left-right frequency characteristic ratio that is a ratio between the magnitude of a gain of a frequency spectrum of an acceleration of the left wheel and the magnitude of a gain of a frequency spectrum of an acceleration of the right wheel, and
    calculate the left-right load ratio based on the left-right frequency characteristic ratio.

7. The wheel load estimation device according to claim 3, wherein the load ratio calculation unit is configured to, based on the wheel speed information,
    calculate a front-rear frequency characteristic ratio that is a ratio between the magnitude of a gain of a frequency spectrum of an acceleration of the front wheel and the magnitude of a gain of a frequency spectrum of an acceleration of the rear wheel,
    calculate the front-rear load ratio based on the front-rear frequency characteristic ratio,
    calculate a left-right frequency characteristic ratio that is a ratio between the magnitude of a gain of a frequency spectrum of an acceleration of the left wheel and the magnitude of a gain of a frequency spectrum of an acceleration of the right wheel, and
    calculate the left-right load ratio based on the left-right frequency characteristic ratio.

8. The wheel load estimation device according to claim 4, wherein the load ratio calculation unit is configured to, based on the wheel speed information,
    calculate a front-rear frequency characteristic ratio that is a ratio between the magnitude of a gain of a frequency spectrum of an acceleration of the front wheel and the magnitude of a gain of a frequency spectrum of an acceleration of the rear wheel,
    calculate the front-rear load ratio based on the front-rear frequency characteristic ratio,
    calculate a left-right frequency characteristic ratio that is a ratio between the magnitude of a gain of a frequency spectrum of an acceleration of the left wheel and the magnitude of a gain of a frequency spectrum of an acceleration of the right wheel, and
    calculate the left-right load ratio based on the left-right frequency characteristic ratio.

9. A wheel load estimation method for estimating a wheel load of a vehicle, the wheel load estimation method comprising:
- acquiring wheel speed information of each wheel included in the vehicle from a wheel speed sensor provided in the vehicle;
- calculating a front-rear load ratio and a left-right load ratio based on the wheel speed information, the front-rear load ratio being a ratio between a load applied to a front wheel of the vehicle and a load applied to a rear wheel of the vehicle, and the left-right load ratio being a ratio between a load applied to a left wheel of the vehicle and a load applied to a right wheel of the vehicle; and
- calculating a wheel load ratio expressing a relative wheel load between the wheels included in the vehicle, with respect to at least one of the wheels of the vehicle, based on the front-rear load ratio and the left-right load ratio.

10. A non-transitory recording medium storing a wheel load estimation program for estimating a wheel load of a vehicle, the wheel load estimation program being configured to cause a computer to execute:
- acquiring wheel speed information of each wheel included in the vehicle from a wheel speed sensor provided in the vehicle;
- calculating a front-rear load ratio and a left-right load ratio based on the wheel speed information, the front-rear load ratio being a ratio between a load applied to a front wheel of the vehicle and a load applied to a rear wheel of the vehicle, and the left-right load ratio being a ratio between a load applied to a left wheel of the vehicle and a load applied to a right wheel of the vehicle; and
- calculating a wheel load ratio expressing a relative wheel load between the wheels included in the vehicle, with respect to at least one of the wheels of the vehicle, based on the front-rear load ratio and the left-right load ratio.

* * * * *